Nov. 19, 1946.                J. M. HAIT                2,411,207
                         CHAIN BEARING SEAL
                        Filed March 4, 1943
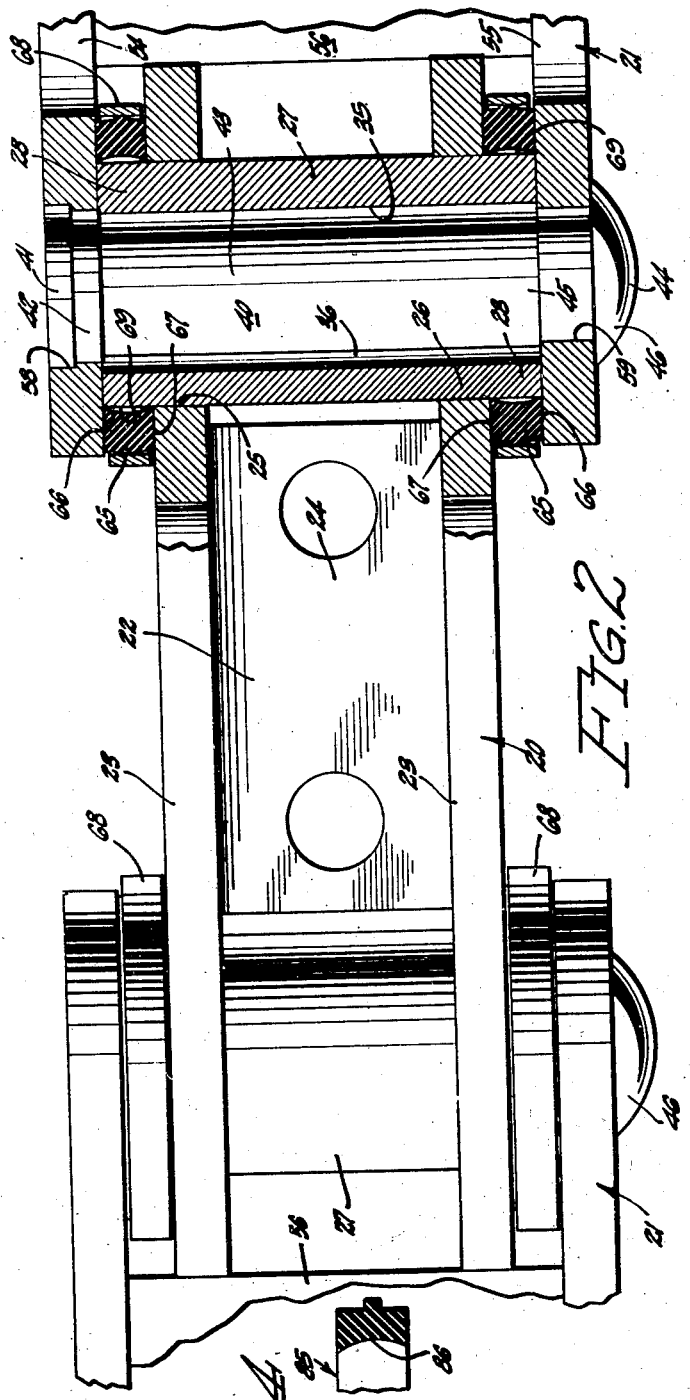
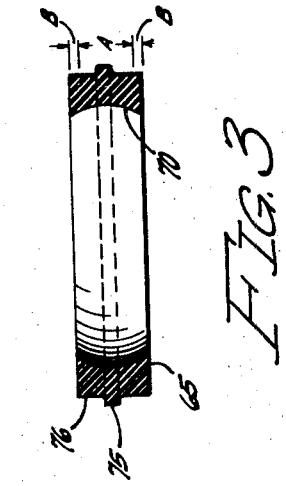
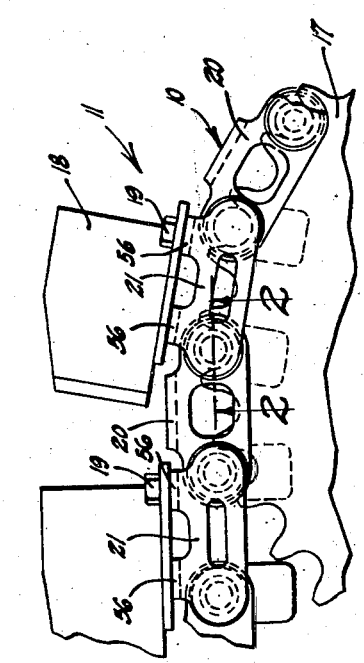
INVENTOR:
JAMES M. HAIT
BY
ATTORNEY Patented Nov. 19, 1946

2,411,207

UNITED STATES PATENT OFFICE 2,411,207

CHAIN BEARING SEAL

James M. Hait, San Gabriel, Calif., assignor to Food Machinery Corporation, San Jose, Calif., a corporation of Delaware Application March 4, 1943, Serial No. 477,938

4 Claims. (Cl. 74—257)

This invention relates to flexible seals, and is particularly useful in protecting chain bearings.

It is a broad object of the invention to provide a flexible seal which will completely exclude passage of liquid or solid material inwardly or outwardly through an annular area surrounding an axis of rotation between two adjacent members.

In heavy chains, such as used in track-laying belts employed on tractors, military tanks and amphibians, the problem of protecting the chain bearings by keeping these lubricated and preventing abrasive material gaining access thereto, is a difficult one as it is necessary for these chains to operate constantly in the presence of large quantities of abrasives and, not infrequently, under water.

It is another object of my invention to provide a chain bearing seal which will retain lubricant within the bearing and exclude foreign matter from said bearings over long periods of operation under difficult conditions.

It is a further object of my invention to provide such a chain bearing seal which is especially adapted for use on the chains employed in track-laying belts as aforesaid.

In the past, efforts have been made to accomplish the foregoing objects by placing a rubber ring in between the adjacent surfaces aforementioned, but I have found that slippage between these rings and the surfaces engaged thereby tends to wear these rings and to work sand into the bearings and permit the escape of lubricant therefrom.

It is accordingly a still further object of my invention to provide a rubber ring seal which will effect complete exclusion of foreign matter from the bearing with which it is used, and an equally complete retention of the lubricant contained within the bearing.

The manner of accomplishing the foregoing objects, as well as further objects and advantages, will be made manifest in the following description taken in connection with the accompanying drawing in which:

Fig. 1 is a side elevational view of a track-laying belt such as used on amphibians, this belt including an endless chain incorporating a preferred embodiment of my invention.

Fig. 2 is an enlarged cross sectional view taken on the line 2—2 of Fig. 1.

Fig. 3 is a cross sectional view showing the preferred form of the rubber ring of my invention in expanded condition as this is manufactured.

Fig. 4 is a view similar to Fig. 3 showing a modified form of the rubber ring of my invention.

Referring specifically to the drawing, Fig. 1 shows a chain 10 which is part of a track-laying belt 11, such as is suitable for use on an amphibian (not shown). The chain 10 is shown as traveling around a sprocket 17 and as having grousers 18 secured thereto by bolts 19. This chain includes inside or bearing links 20 and outside or pin links 21. Each bearing link 20 includes a channel shaped body 22 having side walls 23 joined by a back wall 24, opposite ends of the side walls extending beyond said back wall and having co-axial openings 25 and 26. Driven into these openings is a bearing sleeve 27, ends 28 of this sleeve being left extending outwardly equal distances from outer faces of the walls 23. The sleeve portion disposed in opening 25 as well as the adjacent sleeve end 28 are very slightly larger in diameter than the balance of the sleeve 27. This difference aids in the assembly of the chain 10 but is too small to affect the operation of the present invention. The sleeve 27 has a journal bore 35, in which is formed a lubricant groove 36. Journalling in this bore is a pin 40 of an adjacent pin link 21. The pin 40 preferably has a head 41 with a shoulder 42 formed between this head and the shank 43 of the pin. This shank is turned down to provide an end portion 44 and a shoulder 45. When the chain 10 is assembled the pin end 44 is swedged to form a rivet head 46.

Each pin link 21 includes side plates 54 and 55 which are formed integral with and united by back walls 56 which are adapted to have the grousers 18 mounted thereon as shown in Fig. 1. The side plates 54 and 55 overlie the sleeve ends 28 as shown in Fig. 2 and have concentric openings 58 and 59 which, when the chain 10 is assembled, are concentric with the journal bore 35 of the sleeve 27. The head 41 and shoulder 42 of the pin 40 fit into the opening 58 and the pin end 44 fits into and extends through the opening 59 after which it is swedged to form a rivet head 46 and permanently assemble these two links together.

When assembling the chain 10 I prefer to place resilient rings 65 in the annular spaces about sleeve end portions 28 between opposed radial faces 66 and 67 of the plates 55 and walls 23. I also prefer to position a flat metal band 68 about each of the rings 65 when it is thus assembled with the chain 10 for the purpose of protecting the rings 65 from being cut by sharp rocks and the like.

The rings 65 may be formed of any suitable elastic material such as rubber or rubber substitute, and they are preferably molded of grease resistant synthetic rubber of a durometer hardness of about 30 and in the shape shown in Fig. 3. The term "rubber" may be taken as broadly referring to any such material suitable for use in making these seal rings.

Rubber, either natural or synthetic, with a durometer hardness of about 30 is relatively soft pliable rubber, and this softness is highly preferable in my invention and necessary to the most satisfactory operation thereof, the reason for this being made clear hereinafter.

In assembling the rings 65 with the chain 10 it is also preferable that each of these be concentrically disposed about the link axis which it surrounds. The proper placing of these rings in this manner may be accomplished in many different ways, but I prefer to do this by forming the rings so that each will contact its sleeve end 28 to automatically centralize the ring on this sleeve end.

Another important feature of the invention is that the ring 65, when assembled, be under a very substantial compression between those faces of the links between which it is desired to effect a seal. This compression is preferably along lines of force, a sufficient number of which lie entirely within the material of the ring itself so as to cause a compressive flow of the material of the ring transversely of said lines and in opposite directions.

Still another characteristic which is of importance is that when each seal ring 65 is assembled in the chain 10, its middle portion A (that is the annular portion of the ring which lies in between the face portions B which contact the links) must be sufficiently free from frictional engagement with either link so as to permit the necessary degree of free torsional response of the middle portion A of each ring 65 to the twisting of the ring by its frictional contact with the links during flexure of adjacent links relative to each other.

To bring about the conditions aforesaid, I preferably manufacture the ring 65 as follows. Figs. 2 and 3 are drawn to the same scale so that it can be seen that the ring 65 is molded with an axial dimension approximately one-third greater than the axial dimension of the annular space into which this ring is compressed when the chain 10 is assembled. This causes a very substantial pressure to exist between each rubber ring 65 and the radial faces 66 and 67 on the walls 23 and plates 55. This pressure sets up a constant friction between the axially outermost annular portions B of each ring 65 and these adjacent link faces, which friction accomplishes a torsional twisting of the middle portion A of the ring 65 when the chain is flexed, providing, as already noted, that said middle portion of the ring is sufficiently free to respond in this manner.

The compression of the ring 65 so as to decrease its axial dimension to three-quarters of the axial dimension of the ring as molded, not only produces the constant friction aforesaid between the ring and the link faces, but renders the middle portion A of the ring 65 relatively fluid in character and therefore readily responsive by a twisting action to said frictional forces.

To prevent any substantial degree of friction being set up between the middle portion A of any of the flexible rings 65 and the cylindrical face 69 of the bearing sleeve end 28 disposed therewithin during the operation of the invention, I prefer to form these rubber rings with an arcuate inner face 70 which is channelled deeply enough so that when the chain is assembled as shown in Fig. 2, thereby compressing the ring 65 axially into a space approximately three-quarters as wide as the axial thickness of the rings, the inner face 70 of each ring is still arched slightly away from the cylindrical surface 69 adjacent thereto.

In order to leave the central annular portion A of the material in each ring 65 sufficiently free to twist as aforesaid during the flexing of the chain 10, I also find it advantageous to adopt measures to prevent the metal band 68 from frictionally engaging the outer surface of the ring 65 in such a manner as would impede this twisting. This may be accomplished by any of a large number of expedients but I prefer to do this by forming the ring 65 with a narrow annular bead 75 extending outwardly therefrom midway between opposite end faces of the ring as shown in Fig. 3. When the ring 65 is assembled in the chain 10, the bead 75 is compressed outwardly against the surrounding band 68. Each band 68 is thus suspended in a position to float with respect to the adjacent wall 23 and plate 55, as well as with respect to those portions B of the ring 65 which contact said wall and said plate. In other words, the metal band 68 rotates with the bead 75 with respect to both the adjacent wall 23 and plate 55, and in no wise interferes with the twisting of the central annular portion A of the ring 65.

While I preferably shape each ring 65 to insure that a space will be provided between it and the cylindrical sleeve face 69 therewithin, it is possible to provide this free space by channelling the face 69 and leaving the inner ring face cylindrical. The preferable thing here is to free the ring 65 as much as practical from all friction which would interfere with its twisting annularly in response to rotation of the members 55 and 23 between which it is axially compressed. The sleeve ends are not thus channelled because it would require an extra machining operation in making these sleeves and would also weaken the chain. On the other hand, it is just as easy to mold the rings 65 with channels 70 as it would be to mold them without these channels.

The channels 70 are preferably formed symmetrically in the rings 65 so that when assembling the chain no attention need be paid to which face of the ring 65 is being placed inwards. It is quite feasible and in some respects might be preferable, however, to form the channel 70 non-symmetrical with the minimum internal diameter of the ring at one end only as shown in Fig. 4. Here a ring 85 is made with a channel 86 which is non-symmetrical and has a small diameter mouth 87 at one end of the ring and a larger diameter mouth 88 at the opposite end of the ring.

When assembling the ring 85 with the chain 10, the ring would preferably always have the small diameter mouth 87 disposed inwardly. This would cause the mouth 88 to be adjacent the surface 66 and this mouth would not touch the sleeve end 28 at all when the chain is assembled and the ring 85 compressed. This would completely eliminate friction between the sleeve end 28 and that portion of the seal ring engaging the surface 66.

While the bearing seal of my invention has wide utility, it is preferably employed in a chain mechanism such as is covered in my co-pending application for U. S. Letters Patent, Serial No. 477,937 and filed herewith, now Patent No. 2,397,105, dated March 26, 1946. In this chain mechanism the chain travels about an endless path in which the flexing of the links relative to each other is limited to an angle which is less than the maximum angle through which the ring 65 will twist internally between one extreme position of torque and the opposite extreme position of torque without any slippage occurring between the portions B of the rings and the link faces 66 and 67 engaged thereby.

When the bodies of links 20 and 21 are formed integral as in the illustrated embodiment, the assembly of the chain 10 may be accomplished by spreading the side plates 54 and 55 of a link 21, as by the use of a jack, until these plates are sprung apart a sufficient distance to admit the ends of adjacent links 20 with the rings 65 and bands 68 surrounding the respective sleeve ends 28. When these links are thus properly positioned, the jack is released, permitting the link 20 to spring back to normal. This compresses the rings 65 as shown in Fig. 2. The pins 40 are then inserted in place and riveted to complete the assembly.

Another method of assembling the chain is to employ shims of thin metal which are well greased and applied over opposite ends of the ring 65 to assist in compressing these rings while the end of a link 20 on which these rings are placed is being inserted between plates 55 of an adjacent link 21. After the two links are properly positioned these shims are pulled out and the pins 40 inserted and riveted. The lubricant grooves 36 in each of the links 20 are of course filled with grease or other suitable lubricant before the chain is assembled.

Any lubricant left between the rings 65 and the surfaces 66 and 67 between which they are compressed is squeezed out during the initial operation of the chain 10 so that before long a frictional engagement is set up between the rings and these surfaces. After this takes place the complete hermetic sealing of the chain bearings is accomplished throughout the balance of the working life of the chain.

This life, of course, is much longer where the chain in its normal operation is not flexed a sufficient angle to overcome the friction between the rubber rings and the links which would, of course, cause slippage and wear of the rubber rings, which would decrease their efficiency as bearing seals.

It is desired to point out, however, that even though chain 10 be operated so as to flex the links relative to each other through angles which are in excess of the limits within which the rings 65 will twist internally without slipping, the large angle through which these rings will twist without slippage means that the amount of slippage and therefore the amount of wear which would take place in a chain employing the seals of my invention would be relatively slight. It is therefore clear that the working life of the seals of my invention is bound to be much greater than those of the prior art, no matter what the operating conditions under which these seals are used.

It is realized that rubber bearing seals have been used prior to my invention, but none of these has incorporated the novel features of my invention whereby a very substantial degree of flexure between adjacent links in a chain is possible without any slippage occurring between the seal ring and either of these links.

While I have disclosed herein but one embodiment of my invention, and a single modification thereof, it is to be understood that a multitude of variations might be made in the illustrated embodiment without departing from the spirit of the invention or the scope of the appended claims.

I claim:

1. A linkage unit comprising a pair of links pivotally related on a given axis, means on said links providing an annular space surrounding said axis, said space being bounded by opposed radial surfaces one of which is on each of said links and a substantially cylindrical surface on one of said links, a resilient seal ring compressed in said space between said radial surfaces, said ring, when uncompressed, having an annular concave face which is disposed opposite said cylindrical surface, at least a narrow edge portion of said face being disposed close to said cylindrical surface to centralize said ring about said axis when said unit is being assembled, the major portion of said face being disposed out of frictional contact with said cylindrical surface when said unit is assembled and said ring compressed as aforesaid.

2. A linkage unit comprising a pair of links pivotally related on a given axis, said links providing an annular space surrounding said axis, and bounded by opposed surfaces one of which is on each of said links and a substantially cylindrical surface, a resilient seal ring compressed in said space between said opposed surfaces to spread the cross sectional mass of said ring, said ring, when uncompressed, having an annular concave face disposed opposite said cylindrical surface, and centralizing means disposed along opposite edges of said concave face for engagement with said cylindrical surface to centralize said ring about said axis while said unit is being assembled.

3. In a bearing seal the combination of a bearing sleeve, a wall mounted on said bearing sleeve so that a portion of said bearing sleeve projects therebeyond, a pin journalled in said bearing sleeve, a plate mounted on said pin adjacent the aforesaid extending portion of said sleeve, to provide an annular space surrounding said sleeve portion, and lying between parallel surfaces of said plate and said wall, and a seal ring formed of resilient material disposed within said annular space and subjected to substantial compression between said surfaces, said seal ring being manufactured so that a part of the bore thereof has an internal diameter which fits said sleeve portion to centralize said ring thereon during assembly, a central portion of said bore having a substantially larger diameter than said sleeve fitting portion, so that when said assembly is effected and said ring compressed, as aforesaid, the central portion of said ring is substantially free to flex torsionally to cause said ring to remain in non-slipping engagement with said wall and plate surfaces during a substantial degree of flexing of said plate relative to said wall about the axis of said pin, a narrow band-supporting means formed on said ring and extending radially outward therefrom substantially midway between opposite end faces of said ring, and a protective band surrounding said ring and held in spaced relation from the latter by said supporting means.

4. A chain unit comprising an inside link, an outside link having side portions overlapping the outer sides of one end of said inside link, means pivotally connecting the overlapping portions of said links including a shaft secured to one of said links for rotation therewith relative to the other, elastic rings surrounding said connecting means and interposed and tightly compressed between the opposing surfaces of the inside link and the overlapping outside link, the bore of each of said rings being shaped to provide a bearing surface of relatively narrow width as compared with the thickness of the ring for engagement with said connecting means to centralize the ring thereon when uncompressed and to provide a clearance space between the connecting means and the remainder of said bore when said ring is compressed.

JAMES M. HAIT.